No. 861,773.  
PATENTED JULY 30, 1907.

A. L. STANFORD.
RAILWAY TRAIN BUMPER.
APPLICATION FILED JUNE 18, 1907.

3 SHEETS—SHEET 1.

Witnesses  
Inventor:  
Arthur L. Stanford  
by Banning & Banning  
Attys

No. 861,773. PATENTED JULY 30, 1907.
A. L. STANFORD.
RAILWAY TRAIN BUMPER.
APPLICATION FILED JUNE 18, 1907.
3 SHEETS—SHEET 2.
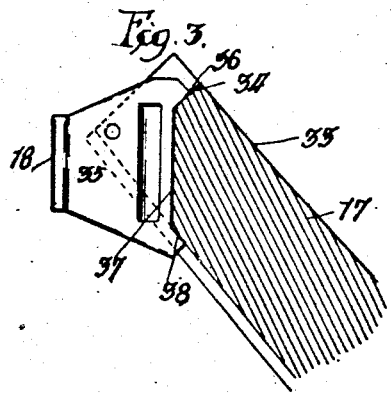
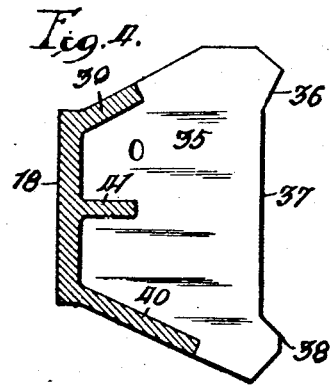
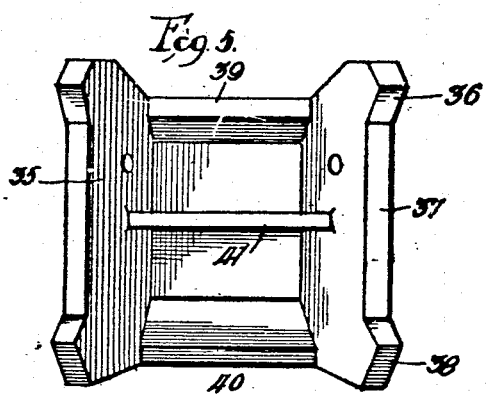
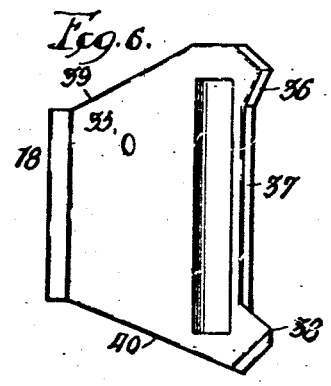
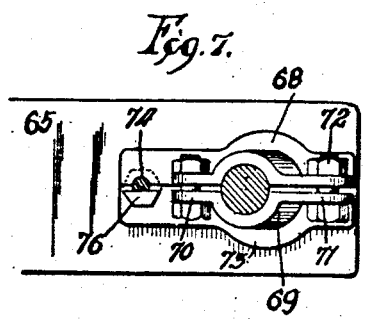
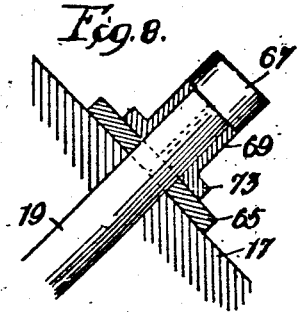
Witnesses
Wm. P. Bond
Pierson W. Banning
Inventor:
Arthur L. Stanford
by Banning & Banning
Attys.

No. 861,773. PATENTED JULY 30, 1907.
A. L. STANFORD.
RAILWAY TRAIN BUMPER.
APPLICATION FILED JUNE 18, 1907.
3 SHEETS—SHEET 3.
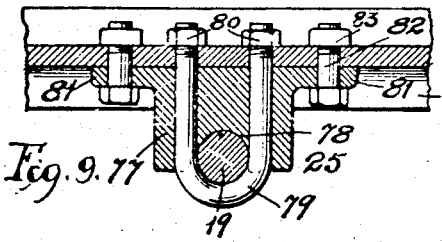
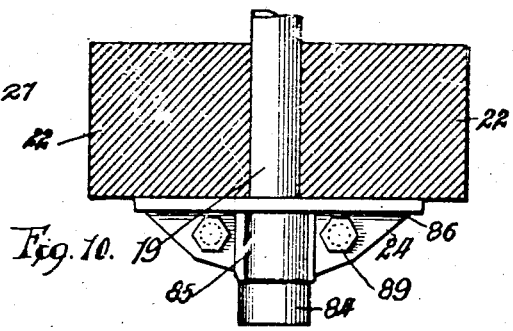
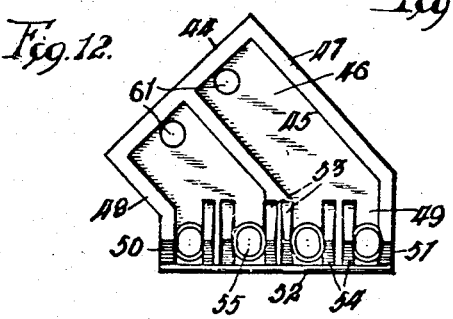
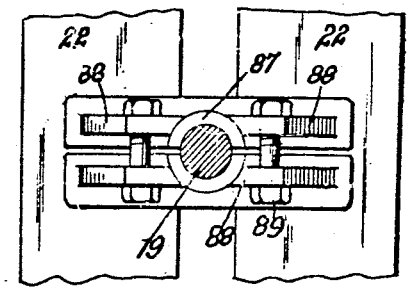
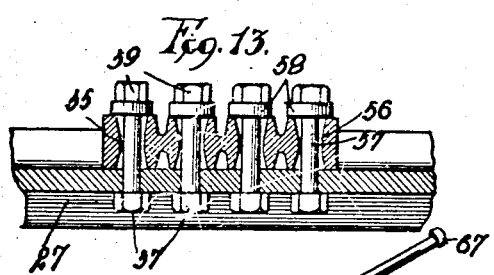
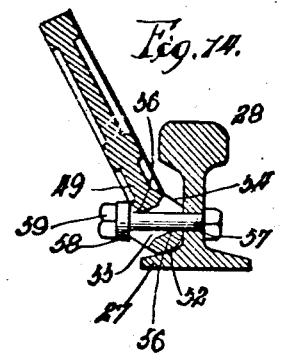
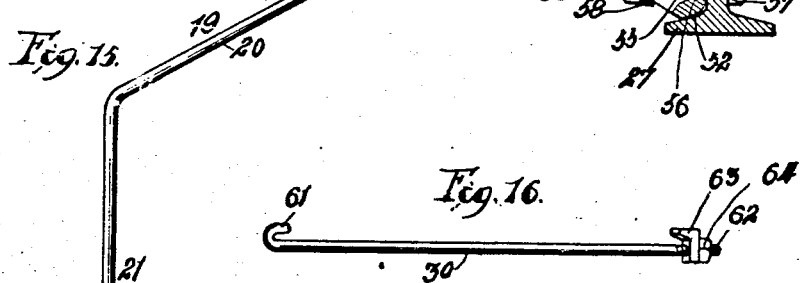
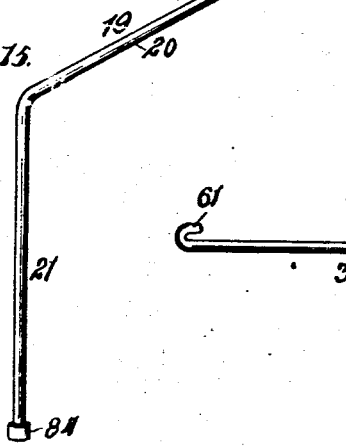
Witnesses
Inventor:
Arthur L. Stanford
by Banning & Banning
Attys

UNITED STATES PATENT OFFICE.

ARTHUR L. STANFORD, OF CHICAGO, ILLINOIS.

RAILWAY-TRAIN BUMPER.

No. 861,773.  Specification of Letters Patent.  Patented July 30, 1907.

Application filed June 18, 1907. Serial No. 379,590.

*To all whom it may concern:*

Be it known that I, ARTHUR L. STANFORD, a citizen of the United States, residing at Chicago, in the county of Cook and State of Illinois, have invented certain new and useful Improvements in Railway-Train Bumpers, of which the following is a specification.

This invention relates to train bumpers of the general character disclosed in Patent No. 537,621, granted to me April 26, 1895; and the invention more particularly relates to numerous structural features of the bumper as a whole, whereby great strength and rigidity are secured.

The invention further relates to the means for uniting the various parts of the bumper together in such manner as to avoid all shearing action and reinforce one another to the greatest possible extent.

The invention furthermore relates to the structure of the bumper head and the means whereby it is secured to and united with the timbers.

The invention likewise relates to the formation of the bumper timbers, whereby the necessity for cutting away the timbers at the point of connection is obviated and the maximum strength of the timbers maintained.

The invention likewise relates to the means for securing the timbers to the rails, and the means for securing and reinforcing the anchor rods, and the invention likewise relates to the means employed for fastening the ends of the anchor rods, whereby the necessity for using a screw threaded nut is avoided, together with the disadvantages incident to such mode of construction.

The invention finally relates to the numerous features of construction and combinations of parts hereinafter described and claimed.

Figure 1:
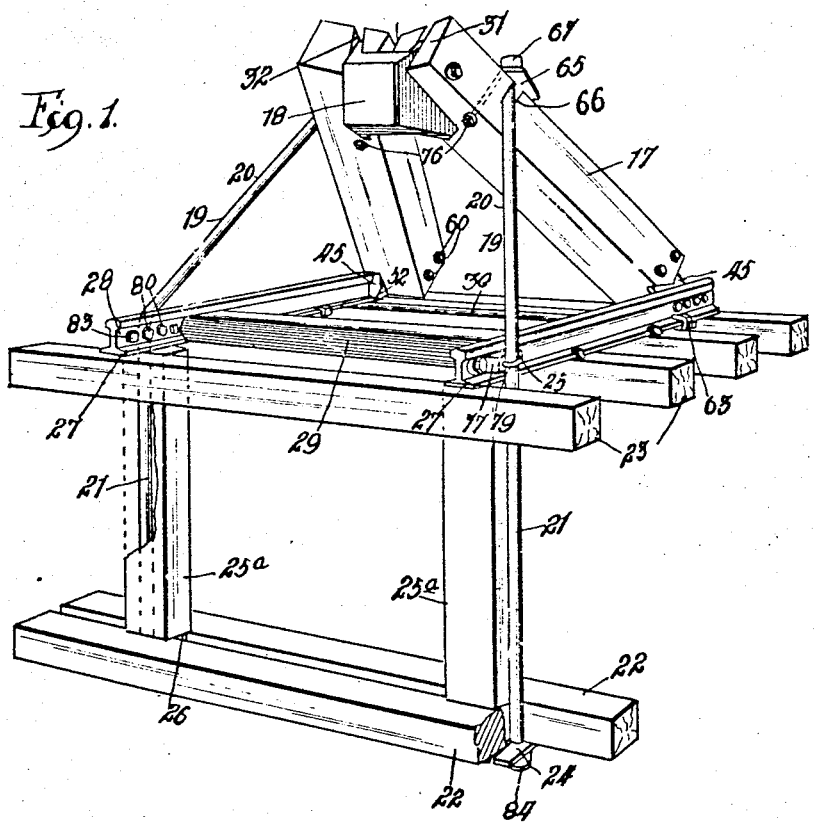
Figure 2:
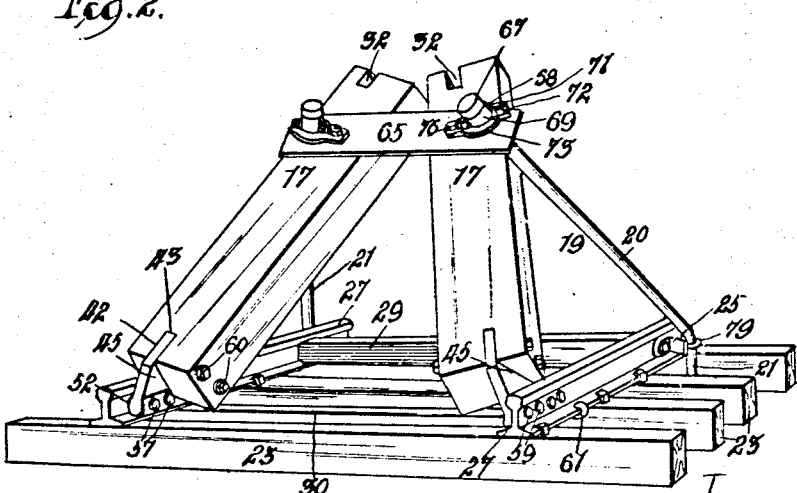

In the drawings Figure 1 is a perspective view of the front of the bumper; Fig. 2 a perspective view of the rear of the bumper; Fig. 3 a side elevation of the head showing the mode of attachment to one of the timbers, which latter is shown in section; Fig. 4 a sectional elevation of the bumper head; Fig. 5 a rear face view of the bumper head; Fig. 6 a side elevation of the same; Fig. 7 a top or plan view of the divided washer for securing the upper end of one of the anchor rods; Fig. 8 a sectional elevation of the same, showing the anchor rod in elevation; Fig. 9 a detail, showing, in section, one of the rail clips for securing the anchor rod to the rail; Fig. 10 a detail, showing the lower end of one of the anchor rods, and the divided bracket, whereby it is secured; Fig. 11 an under face view of the divided bracket of Fig. 10; Fig. 12 a side elevation of one of the shoes, for uniting the lower end of the bumper timber to the rail; Fig. 13 a sectional plan view of the shoe, showing the mode of attachment to the web of the rail; Fig. 14 a cross sectional elevation of the same; Fig. 15 a detail of one of the anchor rods; and Fig. 16 a detail of the tie rod.

As shown in Figs. 1 and 2, the bumper consists, essentially, of a pair of timber beams 17, which are united, at their converging upper ends, by means of a bumper head 18. The timbers are set at an angle of substantially 45 degrees with respect to the horizontal, and the angle of convergence with one another is reduced to the minimum consistent with the use of a bumper structure of this formation. The converging bumper timbers are supported and reinforced by a pair of anchor rods 19, which, like the timbers, are set at an angle approximately 45 degrees with respect to the horizontal or track plane, and the upper ends of said rods, converge toward one another sufficiently to engage the sides of the timbers to which they are secured in a manner to be hereinafter explained.

Each of the anchor rods comprises an upper section 20 and a lower section 21, the upper section, above the track level, being of convergent formation, and the lower section 21, below the track level, extending perpendicularly with respect to the track. The lower or straight section of each of the anchor rods is entered between a pair of tie beams 22, which are immediately below and parallel with the rail ties 23, and are located a considerable distance below the ground. The end of the anchor rod is secured by means of a divided bracket 24, and the anchor rod is secured at its bend or elbow to the web of the adjacent rail by means of a clip 25, the construction of which bracket and clip will hereafter be more fully explained. The anchor tie beams are held against displacement under strain by means of a pair of posts 26, and the upper ends of the posts abut against the flange 27 of the rails 28, so that the tie beams will be held by the weight of the train as it strikes the bumper. The rails, immediately behind the attached elbows of the anchor rods, are reinforced by means of a spacer beam 29 which braces the rails against the inward pull of the anchor rods under strain, and the spacer is supplemented by a tie rod 30, in close proximity to the lower ends of the timbers, which serves an opposite function in preventing the spreading of the rails under the distending strain of the timbers.

The timbers are not only positioned in convergent relation with one another and in diagonal relation with respect to the plane of the track surface, but are also slightly turned or twisted so that their flat side faces are slightly out of the perpendicular. The convergent upper ends 31 are flat and at right angles to the side faces of the timbers, and each of the end faces has cut therein a mortise slot 32, the two slots being cut in substantially parallel relation with respect to the top and bottom faces of the respective timbers, which gives the slots a convergent relation with respect to one another, but the slots are cut perpendicular with respect to the plane of the track, so that the plane of the slots is out of parallel with the plane of the side faces of the timbers. The inner formation of each of the slots is best indicated in Fig. 3, the main portion of the mortise slot terminating in a vertical wall 33 which is at an angle of about 45 degrees with respect to the surface of the timber and the grain of the timber, and the wall 33, at its upper end, terminates in a shoulder 34, which extends transversely, or at an angle of 90 degrees, with respect to the grain of the timber, the mortise slot being of the formation indicated by the inner terminal walls thereof. Each of the convergent mortise slots is intended to receive one of the rearwardly divergent side flanges 35, of the bumper head which serves the dual capacity of a striking plate or stop for the contact of the coupler head, and also as a bridge for securing the convergent ends of the two timbers together. Each of the rearwardly divergent side walls 35 is provided at its rear upper corner with a shoulder 36, which is adapted to engage the shouldered surface 34 of the mortise slot, and the straight vertical edge 37 of the side wall is adapted to engage the straight wall 33 of the mortise slot. The lower rear corner of each of the side walls is provided with a lower shoulder 38, which is adapted to bear against the under face of the timber adjacent to the slot, which formation of the side wall furnishes upper and lower bearing points, at right angles to one another, which, in combination with the straight edge, prevent the bumper head from being tilted in either direction in case it fails to receive a blow directly in the center. The side walls of the bumper head are connected by upper and lower cross walls 39 and 40 respectively, and an intermediate rib or flange 41, which walls and flanges are much narrower or shallower than the side walls, as best shown in Fig. 5, and the upper cross wall 39, which abuts against the convergent ends of the timbers, serves to further reinforce the structures at this point. In view of the fact that couplers of the standard formation are ordinarily positioned a short distance to the right of the center of a car, the bumper head is accordingly positioned, and the mortise slots in the ends of the timbers are cut to meet this requirement.

Each of the lower or divergent ends of the timbers is cut to provide a slot or mortise 42, the inner edge 43 of which extends in substantially transverse relation to the grain of the timber, and is adapted to receive the inner edge 44 of a shoe 45, best illustrated in Fig. 12. The shoe comprises an upper or web portion 46, which is of rectangular formation on three sides and extends at an angle of substantially 45 degrees with respect to the horizontal, so that the upper and lower edges 47 and 48 lie substantially flush with the upper and lower faces of the slotted timber. The lower or base portion 49 of the shoe terminates in front and rear vertical edges 50 and 51 respectively, and a straight base edge 52. The front and rear edges 50 and 51 are, in effect, a continuation of the sloping edges 48 and 47. The lower or base portion 49 of the shoe is provided at suitable intervals with companion flanges 53 which extend outwardly from the web of the shoe, and give to the base portion of the shoe a substantially hexagonal formation, the flanges being provided with outwardly converging angular contact faces 54. This formation of the base of the shoe permits the same shoe to be used in connection with either rail by adjusting the shoe as shown in Fig. 14, to bring the base edge into contact with the flange of the rail, and the angularly disposed lower faces 54, of the adjacent flanges on the same side of the shoe, into contact with the web of the rail, the shoe, as a whole, extending in diagonal relation with respect to the rail and fitting snugly into the angle between the web and the flange. The formation is one which permits the same shoe to be used in connection with either rail by simply bringing one side or the other of the head of the shoe into contact with the desired rail.

Intermediate the flanges the head is provided with a plurality of outwardly divergent holes 55, each of which comprises flat bearing surfaces 56 at the ends of the hole. The bearing faces are adapted to coöperate with bolts 57 which are passed through the web of the rail, and the bearing faces of the hole are so disposed that the bolt will properly register with two of the faces when the shoe is tilted to the necessary angle. The inner end of the bolt has entered thereonto a heavy washer 58, which bridges the space between an adjacent pair of flanges and abuts against the upper angular faces 56 thereof. The washer is held in place by means of a nut 59, the entire formation being one which clamps and holds the shoe tightly in place against the rail, and the angle of the thrust exerted on the shoe by the timber, is one which will avoid a shearing strain and relieve the bolts to the greatest possible extent. The shoe is preferably of ribbed formation and is held within the recess or mortise by means of bolts 60 which are entered through bolt holes 61 near the diagonal end face 44 of the shoe.

The tie rod 30, previously referred to, is provided at one end with a hook 61, which engages the outer flange of one of the rails, and the opposite end 62 of the tie rod is screw threaded and has entered thereon a lug 63 which engages the outer flange of the companion rail and is clamped thereonto by means of a nut 64, which arrangement, in combination with the rail spikes, serves to prevent spreading of the rails under strain.

The upper ends of the anchor rods are entered through the ends of the yoke plate 65 which extends across the upper flat faces of the timbers from side to side thereof and outwardly projects therefrom, as indicated in Figs. 1 and 2. The ends of the anchor rods are entered through diagonally extending slots 66 cut through the upper outer corners of the respective timbers, and the rods terminate in heads 67 which are forged onto, or integrally formed with the rods, to prevent the necessity for threading, which is an inferior mode of applying a head or enlargement to a rod, which must of necessity be subjected to severe strains. The projecting upper end of the tie rod, below the head, is surrounded by a divided washer comprising sections 68, best shown in Fig. 7, each of which sections comprises a half collar 69 adapted to embrace the end of the rod, immediately below the head 67, and the half collar has outwardly extending therefrom inner and outer ribs 70 and 71 respectively, which are secured together by bolts and nuts 72. The inner diameter of each of the collars is slightly less than half a circle, so that when the two sections of the washer are positioned around the end of the rod, the parts may be tightly clamped together by means of the nuts. Each of the sections further comprises an elongated flat base portion 73, which furnishes a bearing for contact with the yoke plate 65, and the inner end of each of the base portions is provided on its inner edge with a half circular recess 74 adapted to embrace a headed bolt, the companion half circular recesses in the two sections furnishing a substantially complete hole for the passage of the bolt. The bolt extends diametrically through the timber, and receives on its lower end a nut 76, which arrangement serves to securely unite the anchor plate to the timbers.

The rail clips 25 are in the form of a block 77 provided with a semi-circular recess 78 adapted to receive the anchor rod immediately below its elbow. The anchor rod is embraced by a U bolt 79, the ends of which pass through the block 77 immediately adjacent to the semicircular recess, and are passed through the web of the rail, as shown in Fig. 9, receiving on their inner ends nuts 80. The body of the clip has outwardly extending therefrom ears 81, through which are entered bolts 82, having on their ends nuts 83, which arrangement of bolts and nuts, in combination with the U bolt, provides a very strong and rigid attachment for the anchor rods, the strain being distributed in such a manner as to avoid any shearing effect, and the body of the block 77 serving to space the anchor rods sufficiently to clear the rail at this point.

The lower end of each of the anchor rods is provided with a forged head 84, best shown in Fig. 10, which head is engaged by the members 85, of the divided bracket 24. Each of the members comprises a base plate 86, on which is formed a half collar 87, from which extend flanges 88. The two members are adapted to be clamped together by means of bolts and nuts 89, which extend through the flanges 88 and clamp the half collar sections tightly around the end of the anchor rod intermediate the enlarged head and the lower faces of the anchor tie beams. The base plates of the companion sections extend transversely with respect to the anchor timbers, and bridge the space between the two timbers, as shown in Fig. 1. The formation of the half collars and flanges is one which affords great rigidity to the divided bracket, and the integral formation of the upper and lower heads on the anchor rods obviates the necessity for employing threads, which might be stripped off under the onerous conditions of actual usage.

When the bumper is subjected to the shock of a colliding car, the bumper head will equally distribute the shock between the two timbers, which receive the shock at an angle of about 45 degrees with respect to the rails, which causes a binding or cramping, rather than a slipping action with respect to the rails to which the timbers are attached. This binding or cramping action prevents shearing of the bolts which secure the shoes to the rails, and the tie rod, which is located at the point of greatest efficiency, prevents any spreading of the rails when subjected to the shock of the collision. The formation of the shoes is one which provides a bearing edge or surface at right angles to the grain of the timber and the line of the shock, and the mode of attachment is one which preserves the entire strength of the timber which is not cut away at any point, except for the mortise slots. The flanged formation of the head of the shoe is one which combines great strength and rigidity and at the same time permits a single shoe to serve either as a right or left shoe, which works a saving in the cost of manufacture, and permits the parts to be more readily positioned and assembled.

The formation of the bumper head is one which serves to equally distribute the shock to both of the timbers and at the same time the head acts as a bridge for securing the convergent ends of the timbers together without the necessity for cutting down the timbers at their point of convergence, and thereby weakening the structure proportionately. The method of forming and securing the anchor rods is one which secures a maximum of strength, and permits the parts to be assembled with ease and rapidity. The provision of the anchor tie beams and the coöperating uprights which abut the under surface of the rails, serves to anchor down the bumper by the entire weight of the engine or car and the track, which effectually prevents the possibility of the anchorage being loosened. The formation of the bumper, as a whole, is one which permits the structure to be applied to a track without cutting or distorting the track in any way, and the resulting structure is one which provides a clearance for the pilot of a locomotive, which is enabled to run in between the anchor rods without difficulty.

The device, as a whole, is one in which the shock is evenly distributed throughout the entire structure, and being founded upon the rails themselves, and held in position by the weight of an approaching train, it is capable of resisting the severe shock of actual usage without danger or difficulty.

What I claim as new and desire to secure by Letters Patent is:

1. A railway bumper, comprising two convergent timbers, means for securing the timbers at their lower ends, and a bumper plate provided with side walls entered into the convergent ends of the timbers, for locking the timbers together, substantially as described.

2. A railway bumper, comprising two convergent timbers, means for securing the timbers at their lower ends, a bumper head provided with side walls entered into the convergent ends of the timbers, for locking the timbers together, and anchor rods extending in a direction in opposition to the direction of the timbers, substantially as described.

3. A railway bumper, comprising two convergent timbers extending upwardly in diagonal relation with respect to the track, and of uniform thickness at their convergent ends, the ends being provided with mortise slots cut in alinement with the grain of the timbers, and a bumper head provided with rearwardly divergent sides entered into the mortise slots, for locking the timbers together and distributing the shock, substantially as described.

4. A railway bumper, comprising convergent timbers extending in diagonal relation with respect to the track, and provided in their convergent ends with inwardly extending mortise slots, each of the slots terminating in a wall diagonally extending with respect to the body of the timber, said wall terminating in a shoulder extending in transverse relation with respect to the body of the timber, and a bumper head provided with rearwardly divergent side walls entered into the mortise slots, each of the side walls terminating at its upper corner in a shoulder adapted to bear against the transversely extending shoulder in the mortise slot, substantially as described.

5. A railway bumper, comprising convergent timbers extending in diagonal relation with respect to the track, and provided in their convergent ends with inwardly extending mortise slots, each of the slots terminating in a wall diagonally extending with respect to the body of the timber, said wall terminating in a shoulder extending in transverse relation with respect to the body of the timber, a bumper head provided with rearwardly divergent side walls entered into the mortise slots, each of the side walls terminating in its upper corner in a shoulder adapted to bear against the transversely extending shoulder in the mortise slot, and each of the side walls being provided at its lower corner with a shoulder adapted to bear against the under face of the timber adjacent to the inner end of the mortise slot, substantially as described.

6. A railway bumper, comprising convergent timbers extending in diagonal relation with respect to the track, and provided in their convergent ends with inwardly extending mortise slots, each of the slots terminating in a wall diagonally extending with respect to the body of the timber, said wall terminating in a shoulder extending in transverse relation with respect to the body of the timber, a bumper head provided with rearwardly divergent side walls entered into the mortise slots, each of the side walls terminating at its upper corner in a shoulder adapted to bear against the transversely extending shoulder in the mortise slot, and anchor rods rearwardly convergent at their upper ends and terminating in vertically extending sections at their lower ends, and means for securing the lower ends to the anchor rods, substantially as described.

7. A railway bumper, comprising convergent timbers forwardly extending in diagonal relation with respect to the track, a bumper head secured to the convergent ends of the timbers, and a shoe at the lower end of each of the timbers, said shoe comprising an attaching portion entered into the end of the timber, and an enlarged base portion having a bearing surface adapted to lie in facial contact with the web of the rail, and a lower edge adapted to contact the flange of the rail, the shoe being reversible, and bolts entered through the head of the shoe and the web of the rail, substantially as described.

8. A railway bumper, comprising a pair of convergent timbers set in diagonal relation with respect to the track, a bumper head secured to the convergent ends of the timbers, each of the timbers having cut in its lower end a mortise slot, and a shoe for each of the timbers comprising a web portion extending in parallel relation with respect to the timber, and a base portion in parallel relation with respect to the track, the base portion having formed on each side a plurality of flanges, each of the flanges having upper and lower bearing faces in angular relation with respect to one another, the base being provided with bolt holes between the flanges, washers adapted to bridge the space between the companion inner flanges and rest upon the upper bearing faces thereof, bolts entered through the web of the rail, through the bolt holes, and through the washers, and nuts on the ends of the bolts, the lower bearing faces of the outer flanges abutting against the web of the rail, and the bottom of the base portion abutting against the flange of the rail, the shoe being reversible and adapted to fit either rail, substantially as described.

9. A railway bumper, comprising convergent timbers forwardly extending in diagonal relation with respect to the track, a bumper head secured to the convergent ends of the timbers, a shoe at the lower end of each of the timbers, said shoe comprising a web portion entered into the end of the timber, an enlarged base portion having a bearing surface adapted to lie in facial contact with the web of the rail, and a lower edge adapted to contact the flange of the rail, the shoe being reversible, bolts entered through the head of the shoe and the web of the rail, and a tie rod connecting the rails together adjacent to the shoes and adapted to prevent spreading, substantially as described.

10. A railway bumper, comprising convergent timbers forwardly extending in diagonal relation with respect to the track, a bumper head secured to the convergent ends of the timbers, a shoe at the lower end of each of the timbers, said shoe comprising a web portion entered into the end of the timber, an enlarged base portion having a bearing surface adapted to lie in pivotal contact with the web of the rail, a lower edge adapted to contact the flange of the rail, the shoe being reversible, bolts entered through the head of the shoe and the web of the rail, a tie rod connecting the rails together to the shoes and adapted to prevent spreading, said tie rod having at one end a hook and having at its opposite end a screw threaded portion, a clip entered onto the screw threaded end of the tie rod, and a nut for holding the clip in place, substantially as described.

11. A railway bumper, comprising a pair of convergent timbers forwardly extending in diagonal relation with respect to the track and secured to the track at their lower ends, a bumper head secured to the convergent ends of the timbers, anchor rods, each comprising a diagonally extending upper section and a vertical lower section, a rail clip for each of the anchor rods, each of said rail clips having a recess adapted to receive the anchor rod near its elbow, a U bolt embracing the tie rod, and having its ends passed through the clip, and through the web of the rail, nuts on the ends of the U bolt, and means for securing the lower end of the anchor rod, substantially as described.

12. A railway bumper, comprising a pair of convergent timbers forwardly extending in diagonal relation with respect to the track and secured to the track at their lower ends, a bumper head secured to the convergent ends of the timbers, anchor rods, each comprising a diagonally extending upper section and a vertical lower section, a rail clip for each of the anchor rods, each of said rail clips having a recess adapted to receive the anchor rod near its elbow, a U bolt embracing the tie rod, and having its ends passed through the clip, and through the web of the rail, nuts on the ends of the U bolt, an anchor tie beam, a post bearing at its lower end against the tie beam, and at its upper end against the rail, and means for securing the anchor rod to the tie beam, substantially as described.

13. A railway bumper, comprising a pair of convergent timbers forwardly extending in diagonal relation with respect to the track and secured to the track at their lower ends, a bumper head secured to the convergent ends of the timbers, anchor rods, each comprising a diagonally extending upper section and a vertical lower section, a rail clip for each of the anchor rods, each of said rail clips having a recess adapted to receive the anchor rod near its elbow, a U bolt embracing the tie rod, and having its ends passed through the clip, and through the web of the rail, nuts on the ends of the U bolt, an anchor tie beam, a post bearing at its lower end against the tie beam, and at its upper end against the rail, a head on the lower end of the anchor rod, and a divided bracket embracing the rod intermediate the head and the tie beam, means for clamping the sections of the bracket together, substantially as described.

14. A railway bumper, comprising convergent timbers extending in diagonal relation with respect to the track, a timber head secured to the convergent ends of the timbers, a yoke plate extending across the rear faces of the timbers, anchor rods comprising vertical lower sections and convergent diagonally extending upper sections entered through the yoke plate, an upper head on each of the anchor rods, a divided washer embracing the rod intermediate the head and the yoke plate, means for clamping the sections of the washer together, means for securing the anchor rod to the rail, an anchor tie beam below the rail, and upright posts interposed between the tie beam and the rails, a head on the lower end of each of the anchor rods, and a divided bracket interposed between each head and the power face of the tie beam, and means for clamping the sections of the bracket together, substantially as described.

15. A railway bumper, comprising convergent timbers forwardly extending in diagonal relation with respect to the rails and secured to the rails at their rear ends, anchor rods each comprising a vertical lower section and an angularly disposed upper section, the upper sections converging toward one another and extending diagonally and rearwardly and in opposition to the timbers, means for securing the convergent upper ends of the anchor rods to the timbers, a bumper head secured to the convergent ends of the timbers, means for securing the anchor rods to the rails, near the elbows of the rods, a tie beam to which the lower ends of the anchor rods are secured, and a pair o uprights interposed between the tie beam and the rails, substantially as described.

16. A railway bumper, comprising convergent timbers forwardly extending in diagonal relation with respect to the rails and secured to the rails at their rear ends, anchor rods each comprising a vertical lower section and an angularly disposed upper section, the upper sections converging toward one another and extending diagonally and rearwardly and in opposition to the timbers, means for securing the convergent upper ends of the anchor rods to the timbers, a bumper head secured to the convergent ends of the timbers, means for securing the anchor rods to the rails, near the elbows of the rods, a pair of tie beams between which the lower ends of the anchor rods are entered, a cross bracket secured to the lower end of each of the anchor rods, and bridging the space between the tie beams, and a pair of uprights interposed between the tie beams and the track structure, substantially as described.

17. In a railway bumper, in combination with a pair of convergent diagonally disposed timbers, a pair of anchor rods secured to the timbers, a tie beam below the track structure to which the lower ends of the anchor rods are secured, and a brace between the tie beam and the track structure, substantially as described.

18. In a railway bumper, in combination with a pair of convergent diagonally disposed timbers, a pair of anchor rods secured to the timbers, a tie beam below the track structure to which the lower ends of the anchor rods are secured, a brace between the tie beam and the track structure, and a spacing beam between the rails adjacent to the anchor rods, substantially as described.

19. In combination with a railway bumper, a shoe adapted to fit either rail, and comprising a diagonally disposed web portion and a horizontally disposed base portion, flanges on both sides of the base portion, each of the flanges having upper and lower convergent bearing faces, giving to the base portion a substantially hexagonal formation, substantially as described.

20. In combination with a railway bumper, a tie rod having on its end an integrally formed head, a divided clamping member surrounding the rod adjacent to the head, and means for securing the sections of the clamping member together, substantially as described.

21. In a railway bumper, a timber set in diagonal relation with respect to the plane of the track, in combination with a shoe comprising a diagonally extending upper portion entered into the end of the timber and having an end surface in substantially transverse relation with respect to the timber, and a base portion having a substantially horizontal under bearing face adapted to contact the rail, and means for attaching the shoe to the rail, substantially as described.

ARTHUR L. STANFORD.

Witnesses:
WALKER BANNING,
SAMUEL W. BANNING.